Dec. 26, 1950   C. S. JACOBS   2,535,929
VISOR MOUNTING DEVICE
Filed Jan. 29, 1949

INVENTOR.
Clare S. Jacobs.
BY
Maxwell K. Murphy
ATTORNEY

Patented Dec. 26, 1950

2,535,929

UNITED STATES PATENT OFFICE 2,535,929

VISOR MOUNTING DEVICE

Clare S. Jacobs, Grosse Pointe Park, Mich., assignor to F. L. Jacobs Co., Detroit, Mich., a corporation of Michigan Application January 29, 1949, Serial No. 73,458

1 Claim. (Cl. 287—93)

The present invention relates to a mounting device for sun visors or glare shields which are commonly mounted on the interior of motor vehicle bodies in the driver's compartment thereof.

The primary object of my invention is to provide an improved mounting device for supporting a glare shield or visor in an automobile body, whereby adjustment of the visor to various desired positions adjacent the windshield or side window of the body may be easily and readily accomplished.

Another object of my invention is to provide an economical construction which may be cheaply manufactured and easily assembled to the automobile body.

A further object of my invention is to provide a visor embodying a bracket having an integral conically tapered bearing portion adapted to receive the conically tapered bent portion of the visor arm and means for holding the arm in the tapered head portion of the bracket whereby the free end of the arm upon which the shield portion of the visor is mounted may be swung in a substantially horizontal arc.

More particularly, the mounting device comprises a unitary bracket, preferably of die cast construction, having a conically tapered aperture formed therein and a shield supporting arm having a substantially right angle bent portion provided with a conical taper adapted to be received in the bracket. The bent portion of the arm is pivotally supported in the tapered bearing head portion of the bracket and held therein by a leaf spring of simple design. The leaf spring tends to draw the tapered portion of the arm into the tapered bearing head of the bracket and thus induces friction, which holds the swinging portion of the arm in various positions of adjustment. The shield portion of the visor is pivotally mounted on the swinging portion of the arm in the conventional manner whereby movement is permitted such that the operator may adjust the shield to higher or lower positions incident to its movement in its horizontal arc, but sufficient friction is provided in connection with both the pivotal movement of the shield on the arm and the swinging of the visor in the bracket such that accidental or inadvertent movement of the visor to positions where it might totally obstruct vision of the vehicle operator is prevented.

Other objects and advantages of the invention will be apparent from the following disclosure, reference being had to the accompanying drawings in which.

Like characters of reference are employed throughout the following description to designate parts shown in the drawing corresponding thereto.

Figure 1:
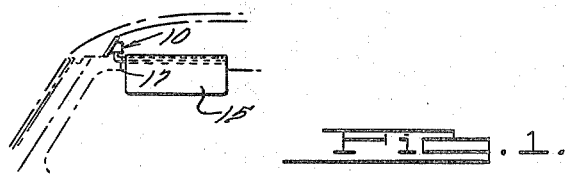
Fig. 1 illustrates the complete visor assembly as it appears when mounted in an automobile body.
Figure 2:
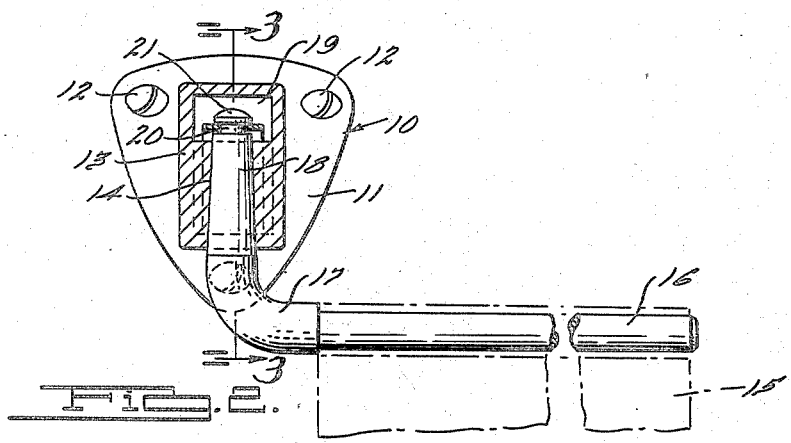
Fig 2 is a vertical section through the mounting device.
Figures 3, 4:
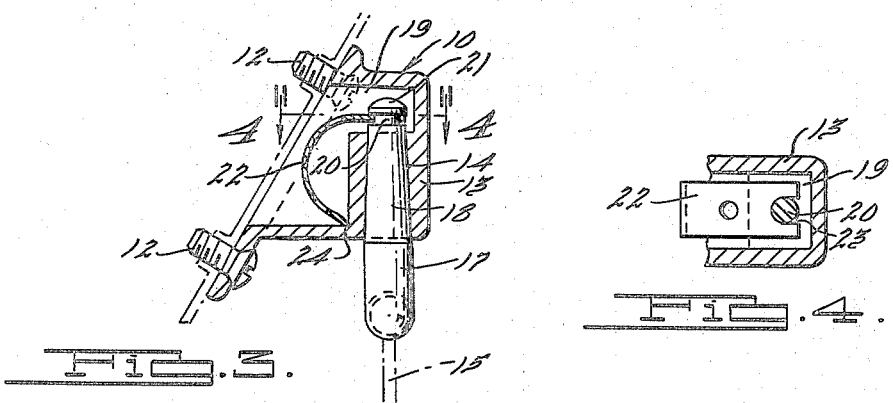
Fig. 3 is a vertical section taken along the line 3—3 of Fig. 2 as viewed in the direction indicated by the arrows.
Fig. 4 is a section taken along the line 4—4 of Fig. 3.
Figure 5:
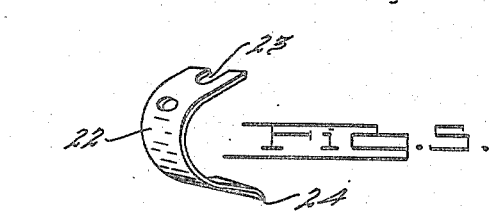
Fig. 5 is a detail view of the leaf spring.

My improved visor mounting device comprises a bracket 10, having a base wall 11, provided with countersunk holes for fastening devices, such as the screws 12. The latter are adapted to secure the bracket 10 to the header portion of an automobile body, as illustrated in Figs. 1 and 3.

The bracket 10 is preferably of die cast construction and has an arm carrying portion 13 formed integrally therewith rearwardly of the plane of the base wall 11. The portion 13 is formed with a solid section having a tapered aperture 14. The aperture is disposed at an angle to the base such that when the bracket is mounted on the slanting header portion of a body, the axis of the aperture is substantially vertical.

The shield portion 15 of the visor is carried by an arm 16 having a portion 17 bent at substantially right angles to the main portion thereof. The shield 15 is pivotally mounted on the main portion of the arm for swinging about the axis of the arm in the manner well known in the art. The bent portion of the arm 17 is conically tapered, as indicated at 18, and is adapted to be received in the aperture 14, the end of the arm protruding beyond the aperture into the recessed portion 19 of the bracket.

Beyond the taper the arm is provided with a circumferential groove 20 adjacent a rounded-off head portion 21. As can be readily seen from the drawing, a U-shaped member 22 of spring steel having a bifurcated end portion providing a recess 23 engages the circumferential groove 20 beneath the head 21. The other end of the leaf spring 22 is slightly bent, as indicated at 24, such that it engages the shoulder formed in the bracket adjacent the arm-carrying portion thereof in such manner that the force of the spring tends to urge the bent portion of the arm axially of the tapered aperture 14.

It may thus be seen that the arm 16 will be retained in the bracket by the leaf spring 22 and the tapered portion thereof is constantly urged axially of the tapered aperture such that sufficient friction is induced to permit the arm to be easily swung about the axis of the aperture while preventing accidental or inadvertent movement thereof.

It will be readily apparent to one skilled in the art that I have provided an exceptionally simple and economically manufactured visor supporting device.

The device consists essentially of only two parts in addition to the arm and shield assembly, i. e., the bracket 10 and the leaf spring 22. The device may be preassembled for easy mounting on the automobile body simply by inserting the tapered portion of the arm into the tapered aperture of the bracket and snapping the leaf spring 22 in place through the relatively large opening provided in the base wall 11.

Although a specific embodiment of my invention has been shown for illustrative purposes, it will be understood that various changes may be made within the scope of the appended claim without departing from the intent or spirit of the invention.

I claim:

A mounting device for glare shields comprising a bracket having a base wall adapted for attachment to an automobile body header and an integral portion disposed rearwardly of said base wall having a chamber therein, said integral portion having a tapered aperture therein; a bent arm carried by said bracket for swinging movement about the axis of said aperture, said arm including a tapered portion received in said aperture and having a circumferential groove adjacent the tapered end thereof, and means for retaining said arm in said aperture and for urging it axially thereof comprising a U-shaped leaf spring having a bifurcated end portion engaging said groove and an opposite end bearing on the wall of said chamber.

CLARE S. JACOBS.

REFERENCES CITED

The following references are of record in the file of this patent:

UNITED STATES PATENTS

| Number | Name | Date |
|---|---|---|
| 232,580 | Welch | Sept. 21, 1880 |
| 1,933,724 | Fox | Nov. 7, 1933 |
| 2,112,464 | Jacobs | Mar. 29, 1938 |
| 2,284,502 | Westrope | May 26, 1942 |
| 2,357,974 | Roberts | Sept. 12, 1944 |